United States Patent
Guo

(10) Patent No.: US 11,252,111 B2
(45) Date of Patent: Feb. 15, 2022

(54) DATA TRANSMISSION

(71) Applicant: NEW H3C TECHNOLOGIES CO., LTD., Zhejiang (CN)

(72) Inventor: Daorong Guo, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 70 days.

(21) Appl. No.: 16/648,212

(22) PCT Filed: Sep. 21, 2018

(86) PCT No.: PCT/CN2018/106875
§ 371 (c)(1),
(2) Date: Mar. 17, 2020

(87) PCT Pub. No.: WO2019/062656
PCT Pub. Date: Apr. 4, 2019

(65) Prior Publication Data
US 2020/0267099 A1 Aug. 20, 2020

(30) Foreign Application Priority Data

Sep. 27, 2017 (CN) .......................... 201710889139.X

(51) Int. Cl.
*H04L 12/861* (2013.01)
*H04L 12/835* (2013.01)
(Continued)

(52) U.S. Cl.
CPC .......... *H04L 49/9068* (2013.01); *H04L 47/30* (2013.01); *H04L 49/3009* (2013.01); *H04L 49/901* (2013.01); *H04L 69/22* (2013.01)

(58) Field of Classification Search
CPC ... H04L 49/068; H04L 47/30; H04L 49/3009; H04L 49/901; H04L 69/22; H04L 49/9068

See application file for complete search history.

(56) References Cited

U.S. PATENT DOCUMENTS 9,356,866 B1   5/2016  Sivaramakrishnan et al.
2005/0270976 A1  12/2005  Yang et al.
(Continued)

FOREIGN PATENT DOCUMENTS

CN   101217472 A   7/2008
CN   102143072 A   8/2011
(Continued)

OTHER PUBLICATIONS

Japanese Patent Office, Office Action Issued in Application No. 2020-517587, dated Mar. 30, 2021, 4 pages. (Submitted with Machine Translation).
(Continued)

*Primary Examiner* — Kibrom T Hailu
(74) *Attorney, Agent, or Firm* — McCoy Russell LLP

(57) ABSTRACT

A method and an apparatus for transmitting data and a network device are provided. In an example of the method, after an interface board and a logical channel both corresponding to first data to be sent are determined, when the logical channel has a capability to send the first data, second data is obtained by adding header information of an interface board identifier and a logical channel identifier to the first data, and stored in a buffer corresponding to the logical channel. Next, when the second data is sent, the second data is read from the buffer, the interface board identifier and the logical channel identifier are obtained from the header information of the read second data, the first data is obtained by removing the header information from the read second data, and the obtained first data is sent to the interface board corresponding to the interface board identifier.

12 Claims, 6 Drawing Sheets

(51) Int. Cl.
  *H04L 12/935* (2013.01)
  *H04L 12/879* (2013.01)
  *H04L 29/06* (2006.01)

(56) References Cited

U.S. PATENT DOCUMENTS

| | | | | |
|---|---|---|---|---|
| 2009/0100489 | A1* | 4/2009 | Strothmann | H04N 21/47202 725/114 |
| 2013/0343528 | A1* | 12/2013 | Polland | H04M 11/062 379/93.06 |
| 2014/0036884 | A1* | 2/2014 | Terry | H04W 28/065 370/336 |
| 2014/0050078 | A1* | 2/2014 | Sato | H04L 41/0654 370/228 |
| 2015/0295862 | A1 | 10/2015 | Banerjee et al. | |
| 2018/0048582 | A1 | 2/2018 | Zhao et al. | |

FOREIGN PATENT DOCUMENTS

| | | | |
|---|---|---|---|
| CN | 102780639 | A | 11/2012 |
| CN | 103546386 | A | 1/2014 |
| CN | 103716076 | A | 4/2014 |
| CN | 104410502 | A | 3/2015 |
| CN | 105162702 | A | 12/2015 |
| CN | 105991471 | A | 10/2016 |
| CN | 106713183 | A | 5/2017 |
| EP | 1050117 | A2 | 11/2000 |
| JP | H1155270 | A | 2/1999 |
| JP | 2015188163 | A | 10/2015 |
| WO | 2008114408 | A1 | 9/2008 |

OTHER PUBLICATIONS

European Patent Office, Office Action Issued in Application No. 18863120.4, dated May 7, 2021, Germany, 5 pages.

ISA State Intellectual Property Office of the People's Republic of China, International Search Report Issued in Application No. PCT/CN2018/106875, dated Dec. 14, 2018, WIPO, 4 pages.

State Intellectual Property Office of the People's Republic of China, Decision of Rejection Issued in Application No. 201710889139.X, dated Nov. 29, 2019, 13 pages. (Submitted with Partial Translation).

ISA State Intellectual Property Office of the People's Republic of China, Written Opinion of the International Searching Authority Issued in Application No. PCT/CN2018/106875, dated Dec. 14, 2018, WIPO, 9 pages.

State Intellectual Property Office of the People's Republic of China, Office Action and Search Report Issued in Application No. 201710889139.X, dated Jun. 10, 2020, 8 pages. (Submitted with Machine Translation).

European Patent Office, Extended European Search Report Issued in Application No. 18863120.4, dated Jul. 16, 2020, Germany, 8 pages.

Japanese Patent Office, Office Action Issued in Application No. 2020-517587, dated Jul. 13, 2021, 4 pages.

\* cited by examiner

DATA TRANSMISSION

CROSS REFERENCE TO RELATED APPLICATIONS

The present application is a U.S. National Phase of International Patent Application Serial No. PCT/CN2018/106875 entitled "DATA TRANSMISSION," filed on Sep. 21, 2018. International Patent Application Serial No. PCT/CN2018/106875 claims priority to Chinese Patent Application No. 201710889139.X filed on Sep. 27, 2017. The entire contents of each of the above-referenced applications are hereby incorporated by reference for all purposes.

BACKGROUND

Generally, a network device (such as a router and a switch) may include a main control board and an interface board. When the network device is configured in a centralized way, the main control board may be connected with the interface board via a high-speed interface; when the network device is configured in a distributed way, the network device may further include a line card, and similarly, the line card may connect with the interface board via the high-speed interface. The high-speed interface is, for example, an Ethernet interface having a GE-level transmission speed. By using an Ethernet interface, occupation of a Central Processing Unit (CPU) may be reduced, concurrency of a multi-core CPU may be improved, and the main control board will not become a performance bottleneck.

Further, an interface board may be connected with another device via a non-Ethernet interface (such as an E1 interface, a T1 interface, an asynchronous serial interface, a synchronous serial interface, and an Analog Modem (AM) interface), and the non-Ethernet interface has a slow transmission speed, for example, a 100M-level transmission speed. Therefore, the speed at which the main control board or the line card sends data to the interface board is severely unmatched with the speed at which the interface board sends data to another device. This leads to, after receiving a large amount of data via the Ethernet interface, that the interface board can only send a small amount of data via the non-Ethernet interface, thereby resulting in packet loss.

BRIEF DESCRIPTION OF THE DRAWINGS

To describe the technical solutions in examples of the present disclosure more clearly, accompanying drawings used in the examples of the present disclosure will be briefly described below. It is apparent that the drawings described below are merely some examples of the present disclosure and those of ordinary skill in the art may also obtain other drawings based on these drawings in the examples of the present disclosure.

DETAILED DESCRIPTION OF THE EMBODIMENTS

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, the information should not be limited to these terms. These terms are used only to distinguish the same type of information from each other. For example, the first information may also be referred to as the second information without departing from the scope of the present disclosure, and similarly, the second information may also be referred to as the first information. Further, depending on the context, the word "if" as used herein may be interpreted as "when" or "as" or "determining in response to".

In an example of the present disclosure, a method of transmitting data is provided, which may be applied to a network device. Herein, description is made by taking that a main control board in the network device is connected with an interface board via a high-speed interface as an example. And in case that a line card is connected with an interface board via a high-speed interface, similar operations are performed, which is not repeated herein. The number of main control boards included in the network device may be one or more, and the number of interface boards may be one or more. The main control board may be connected with the interface board based on an Ethernet interface, a Peripheral Component Interconnect Express (PCIE), a Serial Peripheral Interface (SPI4), or the like, and the interface board may be connected with another device via an E1 interface, a T1 interface, an asynchronous serial interface, a synchronous serial interface, an AM interface, or the like. In a normal circumstance, a data transmission speed between the main control board and the interface board is greater than a data transmission speed between the interface board and another device.

Figure 1:
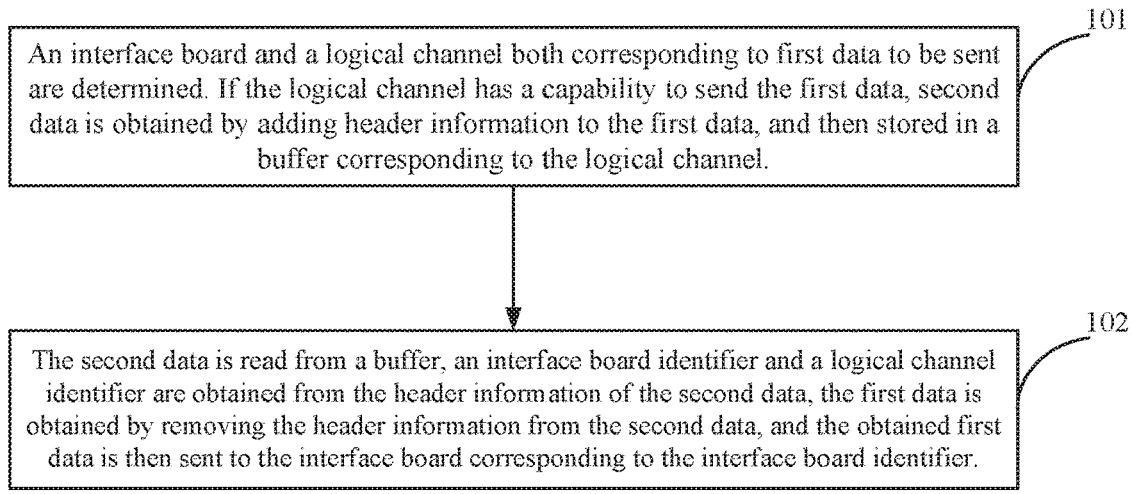
FIG. 1 is a flowchart illustrating a method of transmitting data according to an example of the present disclosure.

FIG. 1 is a schematic flowchart illustrating a method of transmitting data according to an example of the present disclosure. The method of transmitting data may be applied to a network device including a main control board and an interface board.

Block 101: an interface board and a logical channel both corresponding to first data to be sent are determined. If the logical channel has a capability to send the first data, second data is obtained by adding header information to the first data, and then stored in a buffer corresponding to the logical channel. The header information may include, but not limited to an interface board identifier of the interface board and a logical channel identifier of the logical channel.

In an example, a process of "determining an interface board and a logical channel both corresponding to first data to be sent" may include, but not limited to: obtaining an egress interface corresponding to destination address information (such as a destination IP address and/or a destination MAC address) of the first data to be sent by querying a forwarding table based on the destination address information; and determining an interface board and a logical channel both corresponding to the egress interface, as the interface board and the logical channel both corresponding to the first data.

In an example, after the interface board and the logical channel both corresponding to the first data to be sent are determined, it may be further determined whether the logical channel has a capability to send the first data. If yes, second data is obtained by adding header information to the first data; if no, the first data is not sent, but stored in a memory. The first data can be read from the memory only when the logical channel has a capability to send the first data, and the second data is obtained by adding header information to the first data.

In an example, whether the logical channel has a capability to send the first data may be determined in the following manner: obtaining a remaining resource size of the logical channel; if the remaining resource size is greater than or equal to a length of the first data, determining that the logical channel has a capability to send the first data; if the remaining resource size is smaller than the length of the first data, determining that the logical channel has no capability to send the first data.

Further, if the logical channel has a capability to send the first data, the remaining resource size of the logical channel may also be updated to a difference of a current remaining resource size and the length of the first data.

In an example, a process of "obtaining second data by adding header information to the first data" may include, but not limited to the following manner: determining a unique identifier corresponding to the interface board (hereinafter referred to as an interface board identifier), and determining a unique identifier corresponding to the logical channel (hereinafter referred to as a logical channel identifier), then adding the header information to the first data, where the header information may include, but not limited to the interface board identifier and the logical channel identifier. The first data added with the header information may be referred to as second data.

In an example, for a process of "storing second data in a buffer corresponding to the logical channel", each logical channel may correspond to one buffer; however, a plurality of logical channels may also correspond to one buffer. Therefore, the second data may be stored in the buffer corresponding to the logical channel after being obtained.

Block 102: the second data is read from a buffer, an interface board identifier and a logical channel identifier are obtained from the header information of the second data, the first data is obtained by removing the header information from the second data, and the obtained first data is then sent to the interface board corresponding to the interface board identifier.

In an example, after the second data is read from the buffer, the remaining resource size of the logical channel corresponding to the buffer may also be updated to a sum of a current remaining resource size and the length of the first data.

In an example, a window mechanism may be adopted for a buffer of a logical channel to determine whether the logical channel has a capability to send the first data. For example, the logical channel may correspond to a sending window, and a length of the sending window is same as a size of the buffer corresponding to the logical channel. Further, parameters of the sending window may include, but not limited to a window start position, a window end position, and a window-occupied position; a length between the window start position and the window end position is the length of the sending window; a length between the window-occupied position and the window end position is the remaining resource size of the logical channel.

Based on this, the above process of "updating the remaining resource size of the logical channel to a difference of the current remaining resource size and the length of the first data" may include: moving the window-occupied position toward the window end position by a specified length.

Further, the above process of "updating the remaining resource size of the logical channel corresponding to the buffer to a sum of the current remaining resource size and the length of the first data" may include, but not limited to: moving the window-occupied position toward the window start position by a specified length; alternatively, moving the window start position toward the window-occupied position by the specified length, and moving the window end position along the moving direction of the window start position by the specified length. The above specified length may be the length of the first data.

In an example, the position of the second data in the buffer may be further obtained after the second data is read from the buffer, and the window start position of the sending window may be determined based on the position of the second data in the buffer; then, the window end position of the sending window may be moved based on a moving length of the window start position.

In an example, since the header information of the second data includes an interface board identifier and a logical channel identifier, the interface board identifier and the logical channel identifier may be obtained from the header information of the second data, and the first data may be obtained by removing the header information from the second data.

In an example, a process of "sending the first data to the interface board corresponding to the interface board identifier" may include: obtaining a first speed used for the interface board to send the first data through the logical channel, and determining a second speed for sending the first data to the interface board based on the first speed; and sending the first data to the interface board corresponding to the interface board identifier based on the second speed. The second speed is smaller than the first speed.

In an example, a process of "determining a second speed for sending the first data to the interface board based on the first speed" may include, but not limited to the following manner: determining a forwarding manner of the interface board based on feature data, and obtaining third data to be sent at the first speed by processing the first data in the forwarding manner; determining the speed at which the first data is processed as the second speed.

In an example, before determining a forwarding manner of the interface board based on feature data, the following may be further included: querying a pre-configured basic information table for a feature type identifier corresponding to the logical channel identifier, and then obtaining feature data corresponding to the feature type identifier. The basic information table may be used to record a corresponding relationship of the logical channel identifier and the feature type identifier.

Based on the above technical solution, in an example of the present disclosure, a plurality of logical channels may share a processing capability of a same main control board, data may be stored in a buffer corresponding to each logical channel, and the data in the buffer may be sent through the logical channel, thereby solving a problem that the main control board is unmatched with the interface board in speed, avoiding a problem of packet loss of the interface board, and satisfying a Quality Of Service (QOS) requirement.

Figure 2:
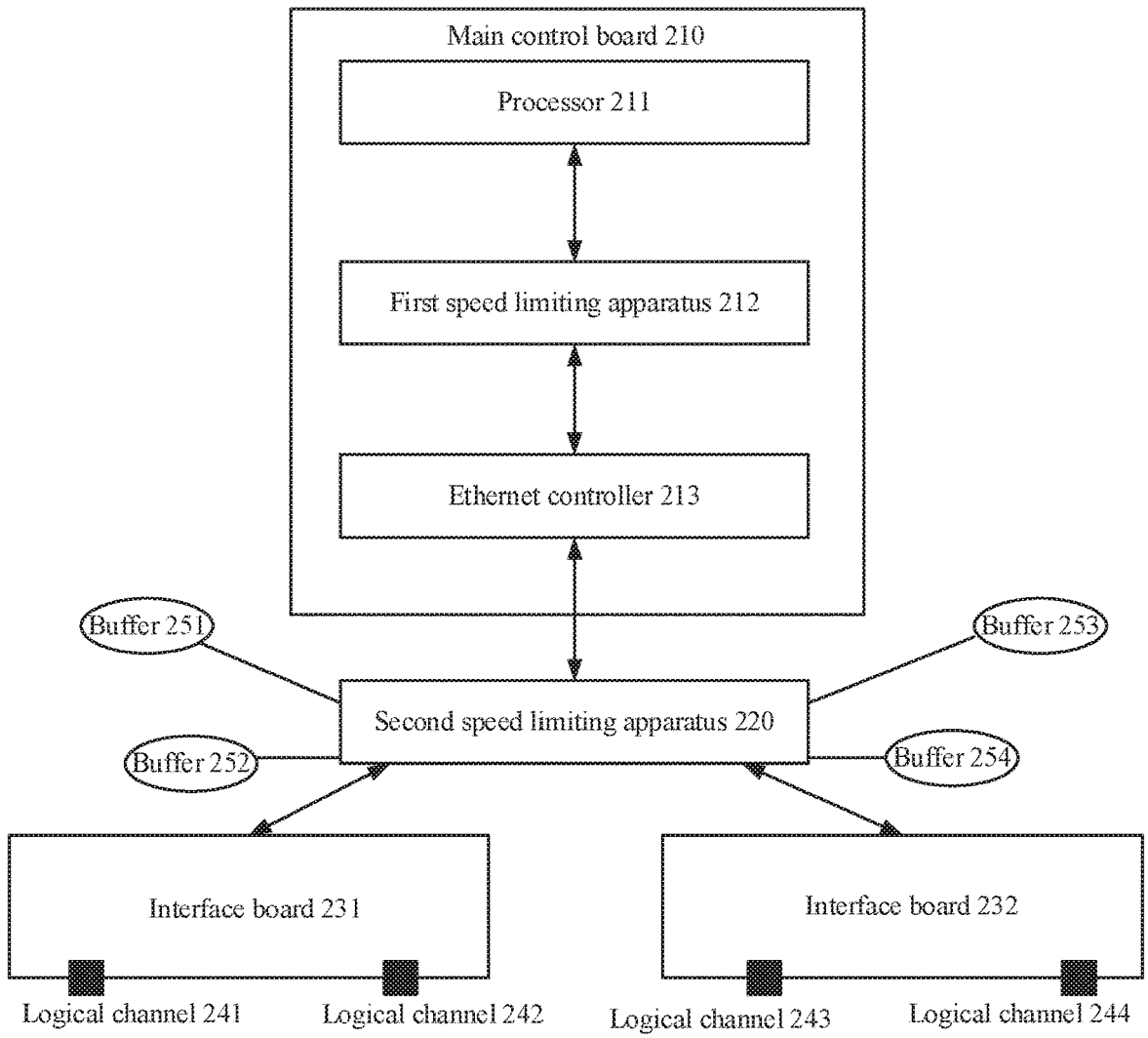
FIG. 2 is a schematic diagram illustrating a structure of a network device according to an example of the present disclosure.

The above solution will be described in detail below in combination with a specific application scenario. FIG. 2 is a schematic diagram illustrating a network of the application scenario. In FIG. 2, descriptions are made with a main control board 210, an interface board 231 and an interface board 232 as an example. However, the number of interface boards may also be more. In FIG. 2, a first speed limiting apparatus 212 is a unit newly added in the main control board 210, and a second speed limiting apparatus 220 is also a newly added unit.

The second speed limiting apparatus 220 may be deployed in the main control board, and each main control board 210 may be deployed with a second speed limiting apparatus 220. In another example, the second speed limiting apparatus 220 may also be deployed in the interface boards 231 and 232, and each of the interface boards 231 and 232 may be deployed with a second speed limiting apparatus 220. In yet another example, the second speed limiting apparatus 220 may also be separately deployed instead of being deployed in the main control board 210 or the interface boards 231 and 232. In FIG. 2, descriptions are made with a second speed limiting apparatus 220 deployed separately as an example.

The first speed limiting apparatus 212 is a unit newly added in the main control board 210, and may be a hardware apparatus of which type is not limited. If the second speed limiting apparatus 220 is a unit newly added in the main control board 210 or the interface boards 231 and 232, the second speed limiting apparatus 220 may be a hardware apparatus. If the second speed limiting apparatus 220 is separately deployed, the second speed limiting apparatus 220 may be an independent single board of which type is not limited.

The main control board 210 may be connected with the second speed limiting apparatus 220 via an Ethernet interface, PCIE, SPI4, or the like, and the second speed limiting apparatus 220 may be connected with the interface board 231/the interface board 232 via the Ethernet interface, the PCIE, the SPI4, or the like. In FIG. 2, the main control board 210 and the second speed limiting apparatus 220 are connected via the Ethernet interface, and an Ethernet controller 213 is configured to achieve an Ethernet interface connection. Further, the interface board 231/the interface board 232 may be connected with another device via an E1 interface, a T1 interface, an asynchronous serial interface, a synchronous serial interface, an AM interface, or the like.

The main control board 210 and the second speed limiting apparatus 220 may be connected in a same manner as the second speed limiting apparatus 220 and the interface board 231/the interface board 232 are connected. In this case, a maximum data transmission speed between the main control board 210 and the second speed limiting apparatus 220 may be same as a maximum data transmission speed between the second speed limiting apparatus 220 and the interface board 231/the interface board 232, and the above both transmission speeds are greater than a maximum data transmission speed between the interface board 231/the interface board 232 and another device.

As shown in FIG. 2, in the main control board 210, a processor 211 (for example, a Central Processing Unit (CPU)) may be connected with the first speed limiting apparatus 212 via a bus, and the first speed limiting apparatus 212 may be connected with the Ethernet controller 213 via a bus.

As shown in FIG. 2, the main control board 210 may also establish a logical channel, where the logical channel is a data transmission channel. For example, when the data is transmitted via the processor 211, the first speed limiting apparatus 212, the Ethernet controller 213 and the second speed limiting apparatus 220, to an egress interface on the interface board 231/the interface board 232, the logical channel may be a data transmission channel "the processor 211→the first speed limiting apparatus 212→the Ethernet controller 213→the second speed limiting apparatus 220→an egress interface on the interface board 231/the interface board 232", that is, the logical channel passes through each of the above devices.

In FIG. 2, although the logical channel is marked on the interface boards 231 and 232, it does not indicate that the logical channel is positioned on the interface boards 231 and 232, but indicates that the egress interface of the logical channel is positioned on the interface boards 231 and 232. The egress interface of the logical channel may be an E1 interface, a T1 interface, an asynchronous serial interface, a synchronous serial interface, an AM interface, and the like, which is not limited herein.

The egress interface of the logical channel may be a logical interface, and may also be a physical interface. Different logical channels may occupy different physical interfaces, and may also share a same physical interface, and one logical channel may also occupy a plurality of physical interfaces. For example, a logical channel 241 occupies a physical interface 1 and a physical interface 2, a logical channel 242 occupies a physical interface 3, and a logical channel 243 and a logical channel 244 share a physical interface 4. That is, a data transmission speed of the logical channel 241 is a sum of data transmission speeds of the physical interface 1 and the physical interface 2, a data transmission speed of the logical channel 242 is a data transmission speed of the physical interface 3, and a sum of data transmission speeds of the logical channel 243 and the logical channel 244 is a data transmission speed of the physical interface 4.

When establishing a logical channel, the main control board 210 may also allocate a buffer for each logical channel and establish a corresponding relationship of the logical channel and the buffer. As shown in FIG. 2, the logical channel 241 corresponds to a buffer 251, the logical channel 242 corresponds to a buffer 252, the logical channel 243 corresponds to a buffer 253, and the logical channel 244 corresponds to a buffer 254. The data to be sent through the logical channel 241 may be cached first to the buffer 251, then read from the buffer 251, and finally sent through the logical channel 241. The data to be sent through the logical channel 242 may be cached first to the buffer 252, then read from the buffer 252, and finally sent through the logical channel 242, and so on.

When establishing a logical channel, the main control board 210 may establish a plurality of logical channels as required, and the number of logical channels is not limited. The logical channel may be a logical channel "the processor 211→the first speed limiting apparatus 212→the Ethernet controller 213→the second speed limiting apparatus 220→an egress interface on the interface board 231/the interface board 232", which is not limited hereto as long as the logical channel can correspond to an egress interface (positioned on an interface board). The process of sending the data through the logical channel is a process of sending the data via the egress interface.

After establishing the logical channel, the main control board 210 may allocate a buffer for the logical channel and configure a sending window for the logical channel. A size of the buffer is related to a data transmission speed of the egress interface corresponding to the logical channel, and a length of the sending window is same as the size of the buffer corresponding to the logical channel. For example, when the data transmission speed of the egress interface is 56 Kbits/s, the size of the buffer and the length of the sending window are both 56 K.

Figure 3A:
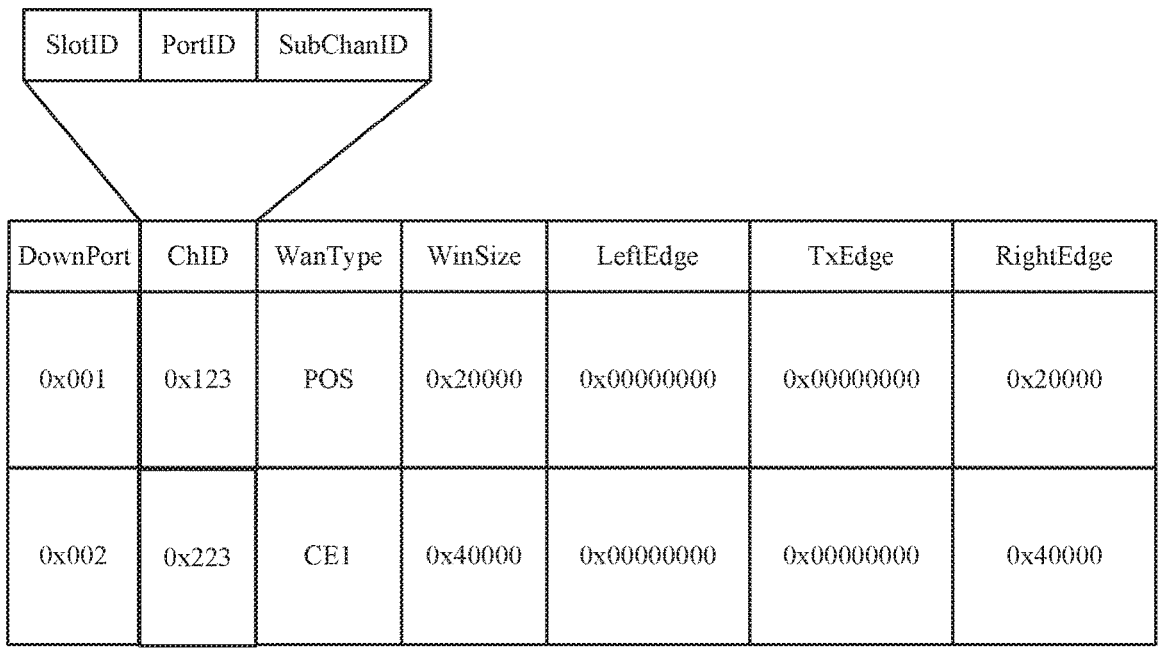
FIG. 3A and FIG. 3B are schematic diagrams illustrating a basic information table according to an example of the present disclosure, respectively.
Figure 3B:
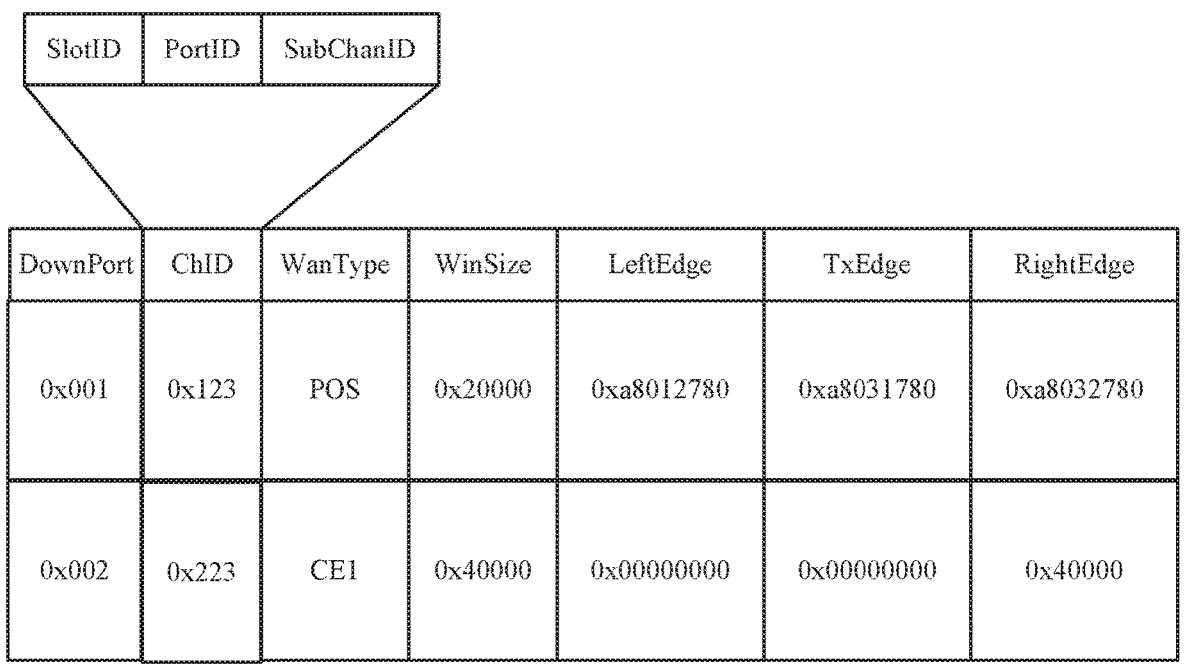

The first speed limiting apparatus 212 may include a basic information table of each logical channel, and basic information of the logical channel may include, but not limited to: an interface board identifier, a logical channel identifier, an interface type, window position information, and the like. Each logical channel may correspond to a basic information table, and content of the basic information table may be referred to FIG. 3A or FIG. 3B. FIG. 3A illustrates an example of the basic information table at an initial moment. FIG. 3B illustrates an example of the basic information table at a particular moment.

An interface board identifier DownPort is an identifier of a downstream port that is on a main control board and connected with an interface board, and indicates a downstream port number of the main control board. The downstream port number is uniformly numbered in a system. The main control board may determine through which downstream port the data is sent to the interface board based on the downstream port number.

A logical channel identifier (ChID) is a unique identifier of a logical channel. For example, the logical channel identifier may be formed by combining a slot number (SlotID) of an interface board, a port number (PortID), and a sub-channel number (SubChanID). The slot number occupies highest 4 bits, and may support 16 slots; the port number occupies middle 6 bits, and may support 64 ports; the sub-channel number occupies last 12 bits, and may support a maximum of 4096 sub-channels. In this disclosure, the logical channel identifier formed by combining the slot number, the port number, and the sub-channel number is only an example, which is not limited herein.

An interface type WanType is a type of an interface corresponding to a logical channel, such as POS, CE1, CPOS, AsySer (an asynchronous serial interface), an E1 interface, a T1 interface, and an AM interface, which is not limited herein.

Window position information may include a length WinSize of a sending window, a left edge LeftEdge of a window, a right edge RightEdge of a window, and a current data sending edge TxEdge. The left edge LeftEdge of the window may also be referred to as a window start position. The right edge RightEdge of the window may also be referred to as a window end position. The length WinSize of the sending window may be, for example, 128 K bytes (i.e., 0x20000), which indicates an allowed maximum length. The length WinSize of the sending window is same as the size of the buffer corresponding to the logical channel, and a length between the left edge LeftEdge of the window and the right edge RightEdge of the window is the length WinSize of the sending window. The current data sending edge TxEdge may also be referred to as a window occupied position. When data is sent next time, the current data sending edge TxEdge may be accumulated from the current position. For example, if the left edge LeftEdge of the window is 0 and the length of the first data is 64, the current data sending edge TxEdge is 64 after the first data is sent; if the length of the second data is 304, the current data sending edge is 368 (64+304) after the second data is sent, and so on; when the current data sending edge TxEdge is positioned between the left edge LeftEdge of the window and the right edge RightEdge of the window, it indicates that the logical channel has a capability to send the data; when the current data sending edge TxEdge exceeds the right edge RightEdge, it indicates that the logical channel has no capability to send the data.

The second speed limiting apparatus 220 may include a basic information table of each logical channel, and the basic information of the logical channel may include, but not limited to: an interface board identifier, a logical channel identifier, an interface type, window position information, a feature type identifier, and the like. Each logical channel may correspond to a basic information table. The basic information table of the second speed limiting apparatus 220 is similar to the basic information table of the first speed limiting apparatus 212, except that the basic information table of the second speed limiting apparatus 220 is added with a feature type identifier, where the feature type identifier may be a Feature ID used to index a feature table and corresponds to a FeatureID of the feature table. Other content of the basic information table will not be described herein.

In the above application scenario, the method of transmitting data in an example of the present disclosure may include the following blocks.

Block a: after receiving first data to be sent, the first speed limiting apparatus 212 determines an interface board and a logical channel both corresponding to the first data. Specifically, an egress interface corresponding to destination address information (such as a destination IP address and/or a destination MAC address) of the first data may be obtained by querying a forwarding table based on the destination address information. The egress interface corresponds to an interface board and a logical channel, the interface board is an interface board corresponding to the first data and the logical channel is a logical channel corresponding to the first data. As another example, the information of the interface board and the logical channel may also be notified by the processor 211, a determination manner of which is not limited.

Block b: the first speed limiting apparatus 212 determines whether the logical channel has a capability to send the first data. If yes, block c is performed; if no, the first data is not sent, but stored in a memory. Block c will be performed when the logical channel has a capability to send the first data.

When sending the first data, the first speed limiting apparatus 212 may determine whether the logical channel has a capability to send the first data based on window position information in a basic information table and a length of the first data. For example, if the current data sending edge TxEdge is still positioned between the left edge LeftEdge of the window and the right edge RightEdge of the window after being moved rightward by the length of the first data, it indicates that the logical channel has a capability to send the first data; if the current data sending edge TxEdge exceeds the right edge RightEdge of the window after being moved rightward by the size of the first data, it indicates that the logical channel has no capability to send the first data.

Further, when the logical channel has a capability to send the first data, the first speed limiting apparatus 212 may also adjust the position of the current data sending edge TxEdge based on the length of the first data and the position of the current data sending edge TxEdge in the sending window.

Figure 3C:
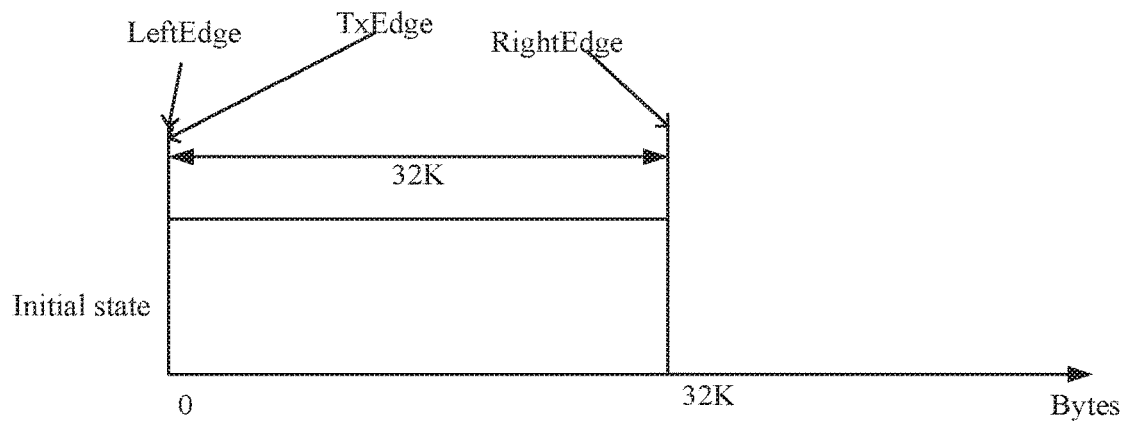
FIG. 3C-FIG. 3F are schematic diagrams illustrating window management according to an example of the present disclosure, respectively.
Figure 3D:
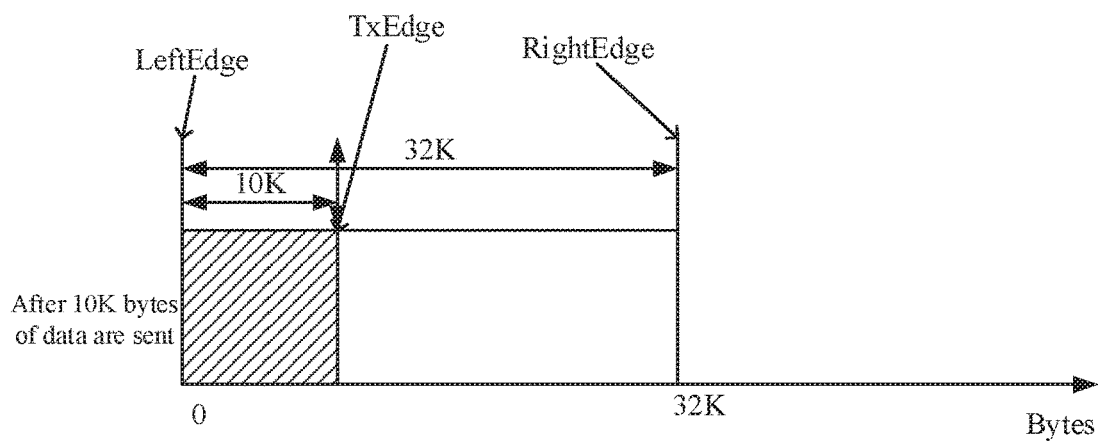
Figure 3E:
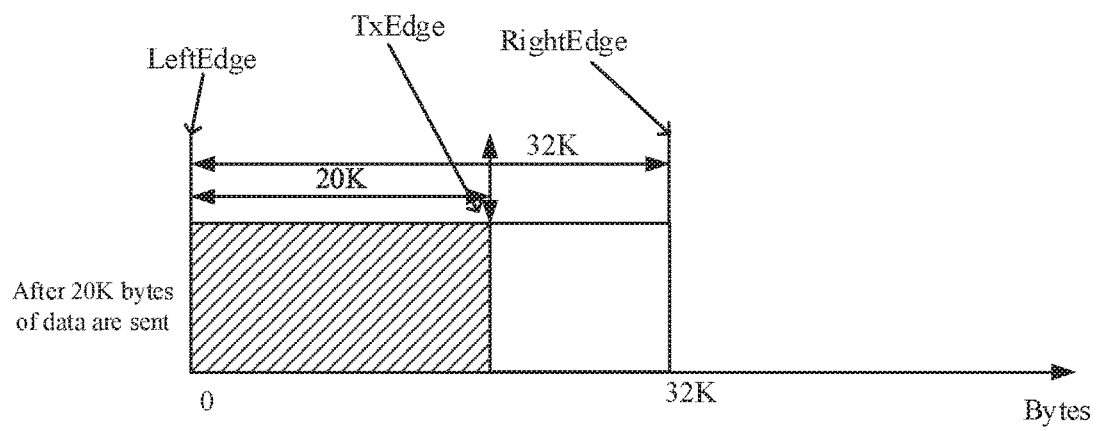
Figure 3F:
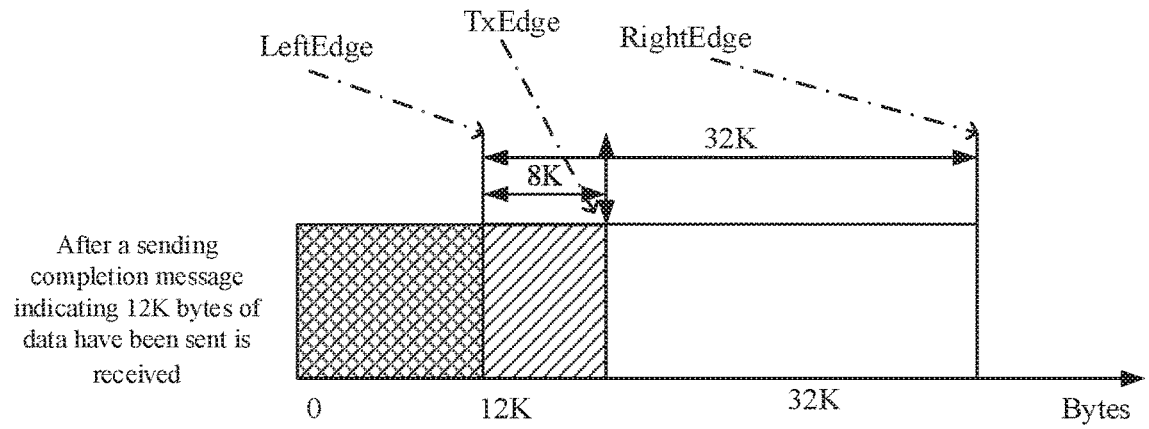

As shown in FIG. 3C, at initialization, the left edge LeftEdge of the window and the current data sending edge TxEdge are both 0. As shown in FIG. 3D, after 10K bytes of data is sent, the current data sending edge TxEdge is changed to 10 K. As shown in FIG. 3E, after 20 K bytes of data is sent, the current data sending edge TxEdge is changed to 20K. After a data sending completion message is received, if the data sending completion message indicates that the second speed limiting apparatus 220 already reads 12K bytes of data from a buffer, the left edge LeftEdge of the window is slid rightward by 12K, and the right edge RightEdge of the window is slid rightward, by, for example, 12K. A schematic diagram after sliding the edges is shown in FIG. 3F.

Figure 4A:
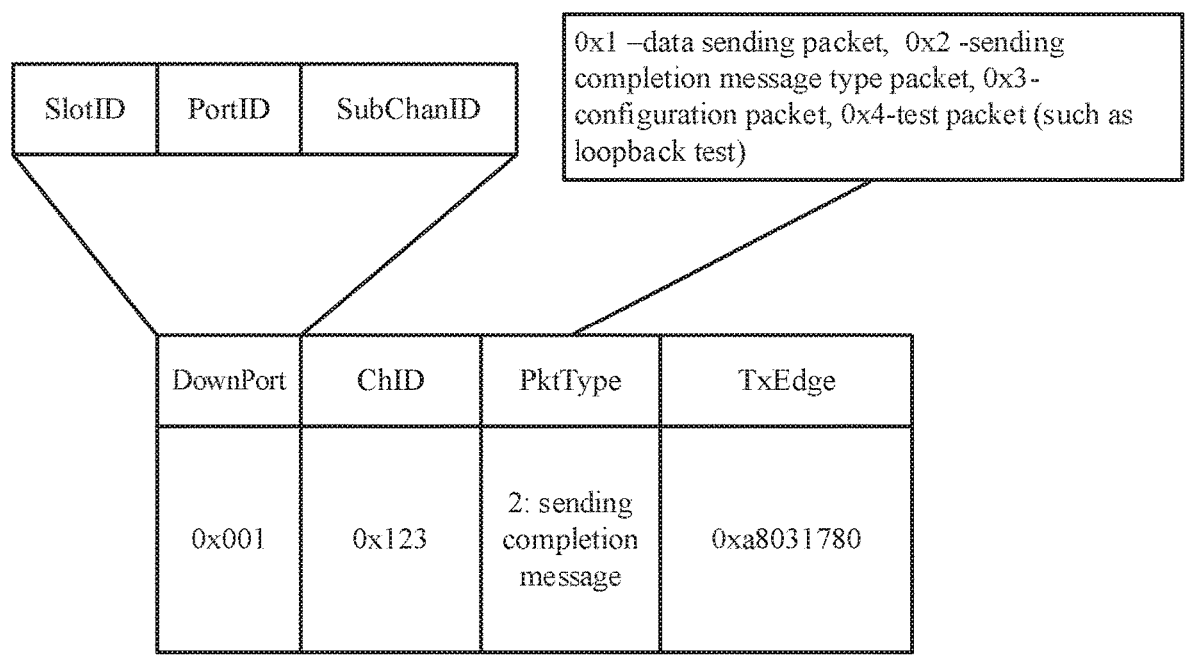
FIG. 4A and FIG. 4B are schematic diagrams illustrating a message format according to an example of the present disclosure, respectively.

FIG. 4A is a schematic diagram illustrating a data sending completion message. When the data sending completion message is received, if the current data sending edge TxEdge in the data sending completion message is positioned between the left edge LeftEdge of the window and the right edge RightEdge of the window, the window may be slid based on the current data sending edge TxEdge in the data sending completion message. For example, the left edge LeftEdge in the window is moved rightward to the position of the current data sending edge TxEdge in the data sending completion message, and the right edge RightEdge in the window is slid rightward accordingly. The length between the left edge LeftEdge and the right edge RightEdge after the sliding is the current length WinSize of the sending window. If the current data sending edge TxEdge in the data sending completion message is not positioned between the left edge LeftEdge of the window and the right edge RightEdge of the window, the data sending completion message is discarded, and the window is no longer slid.

Even if data may be lost when the first speed limiting apparatus 212 sends the data to the second speed limiting apparatus 220, and/or, a data sending completion message may be lost when the second speed limiting apparatus 220 sends the data sending completion message to the first speed limiting apparatus 212, a window may be correctly slid as long as there is data successfully sent and a data sending completion message corresponding to the data is successfully sent in a subsequent process. In this way, sending resources will not be lost and the sending will not be stopped due to packet loss. For example, since a window occupied position of the N-th piece of data implies length information of the N-1-th piece of data, when the N-1-th piece of data is lost, if a data sending completion message of the N-th piece of data is received, the sending resources of the N-th piece of data may be recovered and the sending resources of the N-1-th piece of data may also be recovered at the same time when the window is slid based on the current data sending edge TxEdge in the data sending completion message. Therefore, even if the data is lost, and/or, the data sending completion message is lost, the resources may be correctly recovered.

Block c: the first speed limiting apparatus 212 obtains second data by adding header information to the first data and sends the second data to the Ethernet controller 213, and the Ethernet controller 213 sends the second data to the second speed limiting apparatus 220.

Figure 4B:
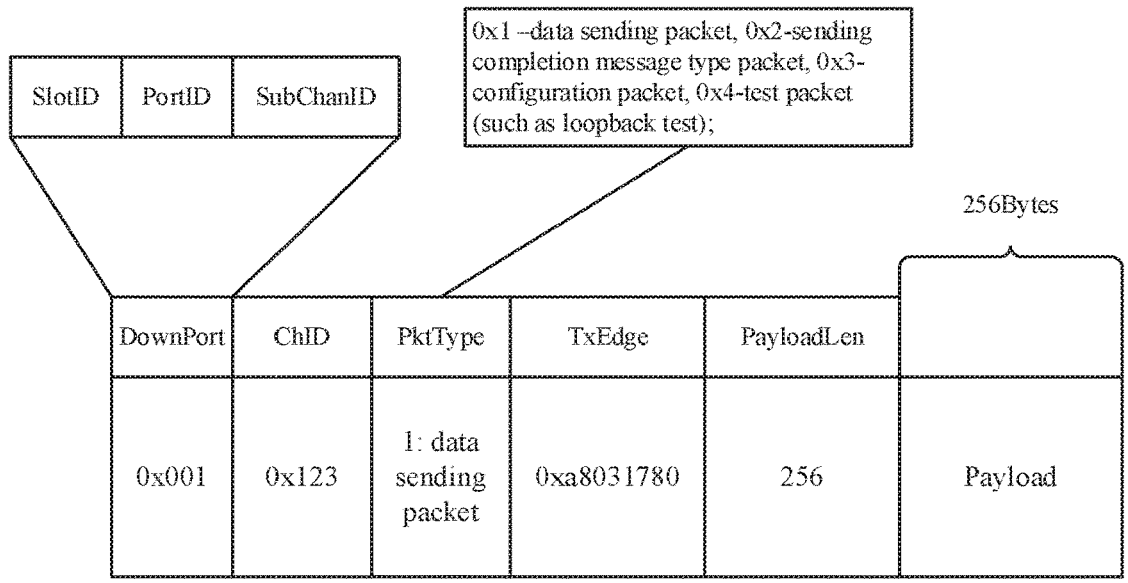

Specifically, if the logical channel has a capability to send the first data, the first speed limiting apparatus 212 may obtain modified data, i.e. the second data, by adding the header information to the first data. FIG. 4B is a schematic diagram illustrating second data. Then, the first speed limiting apparatus 212 may send the second data to the Ethernet controller 213, and the Ethernet controller 213 may send the second data to the second speed limiting apparatus 220.

When the first speed limiting apparatus 212 adds the header information to the first data, the header information may include, but not limited to the following content: an interface board identifier, a logical channel identifier, an interface type, a packet type, a sending edge of window, and a payload length. The window-occupied position of a first data packet may be a length of a data packet to be sent currently; the window-occupied position of a second data packet may be a sum of the window-occupied position of the first data packet and a length of the second data packet; the window-occupied position of a third data packet may be a sum of the window-occupied position of the second data packet and a length of the third data packet, and so on.

After sending the second data to the Ethernet controller 213, the first speed limiting apparatus 212 may also update window information corresponding to the logical channel. For example, the current data sending edge TxEdge may be moved rightward by the length of the first data.

Block d: after receiving the second data, the second speed limiting apparatus 220 analyzes out a logical channel identifier from the header information of the second data and caches the second data to a buffer corresponding to the logical channel identifier.

For example, if the logical channel identifier analyzed out from the header information of the second data by the second speed limiting apparatus 220 indicates the logical channel 241, the second data may be cached to the buffer 251 corresponding to the logical channel 241.

Block e: when sending the second data, the second speed limiting apparatus 220 reads the second data from the buffer corresponding to the logical channel, obtains an interface board identifier and a logical channel identifier from the header information of the second data, obtains the first data by removing the header information from the second data, and sends the first data to the interface board corresponding to the interface board identifier. Further, the second speed limiting apparatus 220 may also notify the interface board that the first data may be sent through the logical channel corresponding to the logical channel identifier, so that the interface board may send the first data through the logical channel corresponding to the logical channel identifier.

For example, the second speed limiting apparatus 220 may read the second data from the buffer 251 and obtain an identifier of the interface board 231 and an identifier of the logical channel 241 from the header information of the second data. Then, the second speed limiting apparatus 220 may obtain the first data by removing the header information from the second data, send the first data to the interface board 231, and notify the interface board 231 that the first data may be sent through the logical channel 241.

After the first data is sent to the interface board, it is also desired to notify the interface board of the identifier of the logical channel to enable the interface board to send the first data through the logical channel, where the notification mechanism is not limited. For example, the second speed limiting apparatus 220 may send the logical channel identifier to the interface board, so that the interface board may send the first data through the logical channel corresponding to the logical channel identifier. In another example, the second speed limiting apparatus 220 may send the first data to the interface board through the logical channel corresponding to the logical channel identifier, and the interface board may send the first data through the logical channel after receiving the first data through the logical channel.

When sending the first data to the interface board, the second speed limiting apparatus 220 may firstly obtain a first speed used when the interface board sends the first data through the logical channel, determine a second speed to be used for sending the first data to the interface board based on the first speed, and send the first data to the interface board based on the second speed. Further, in the process of "determining a second speed to be used for sending the first data to the interface board based on the first speed", the second speed limiting apparatus 220 may determine a forwarding manner of the interface board based on feature data and obtain third data to be sent by the interface board at the first speed by processing the first data in the forwarding manner; when the third data is obtained, the speed for processing the first data is determined as the second speed where the second speed is smaller than the first speed.

The second speed limiting apparatus 220 may also store a feature table. The feature table is used to record a data flow feature, and the data flow feature may include a feature type identifier (FeatureID) and feature data. The feature type identifier is used to indicate some type of feature, and the feature data may be obtained based on the feature type identifier.

Further, the feature data may include, but not limited to, one or any combination of the following contents: a channel speed (Speed), such as 56 Kbits/s and 64 Kbits/s; an inter-frame gap (IFG), such as the number of pad characters inserted between the inter-frame gaps, where the inter-frame gap may be configured empirically; a block size BlockLen for sending data to a physical layer chip; and a lead PreTxLen for sending data to the physical layer chip.

The second speed limiting apparatus 220 may obtain a feature type identifier corresponding to a logical channel identifier in the header information of the second data by querying a basic information table based on the logical channel identifier. Then, the feature data corresponding to the feature type identifier may be obtained by querying a feature table based on the feature type identifier. Based on this, the second speed limiting apparatus 220 may determine a forwarding manner of the interface board based on the above feature data.

The forwarding manner is a forwarding manner in which the interface board sends data externally. Different protocols may correspond to different forwarding manners or a same forwarding manner and the forwarding manner is related to the type of the protocol. For example, since High-level Data Link Control (HDLC) data frames are separated by a flag sequence, i.e., a binary sequence 01111110, there may be consecutive bits same as the flag sequence in a data bit string. To prevent this and ensure transparent transmission of data, the forwarding manner may be as follows: with a bit padding technology, inserting one "0" after five consecutive "1"s to ensure the transparent transmission of data. Certainly, the forwarding manner may be another circumstance, which is not limited.

After obtaining the forwarding manner of the interface board, the second speed limiting apparatus 220 may simulate the transmission based on the forwarding manner. Specifically, the third data to be sent at the first speed is obtained by processing the first data in the forwarding manner; the speed for processing the first data in the process of obtaining the third data is determined as the second speed. The first speed is a speed at which the interface board actually sends the data, and the second speed is a speed at which the second speed limiting apparatus 220 actually sends the data. Further, the second speed limiting apparatus 220 simulates the transmission in real time based on the forwarding manner.

The second speed limiting apparatus 220 simulates the transmission based on the following reasons. Assume that the first speed used when the interface board sends the data through the logical channel is 56 Kbits/s. If the speed for providing the data to the interface board is 56 Kbits/s, the interface board may firstly process the data in the above forwarding manner, for example, add additional information to the data by using the bit padding technology, when sending the data. In this case, the data finally sent by the interface board may be, for example, at 60 Kbits/s greater than 56 Kbits/s, that is, the data sent by the interface board is overflowed. Since the interface board can only send data of 56 Kbits/s, rather than data of 60 Kbits/s, partial data loss may be caused.

Therefore, the second speed limiting apparatus 220 may firstly obtain the first speed, for example, 56 Kbits/s, when the interface board sends the data through the logical channel. Then, the second speed limiting apparatus 220 may read the data from a buffer and process the data in the above forwarding manner, for example, add information to the data by adopting a bit padding technology. During the process, a speed for reading the data from the buffer is determined when generating the data to be sent at 56 Kbits/s, and the speed for reading the data is the second speed, for example, 52 Kbits/s. Therefore, the speed for providing the data to the interface board by the second speed limiting apparatus 220 is 52 Kbits/s.

In conclusion, the speed for providing the data to the interface board is 52 Kbits/s, rather than 56 Kbits/s. When sending the data, the interface board may firstly process the data in the above forwarding manner, for example, add information to the data by adopting a bit padding technology. In this way, the data is finally sent by the interface board at 56 Kbits/s without any data overflow. Also, data loss is not caused, thereby increasing an efficiency of the interface board, improving data transmission quality, realizing a QOS application, avoiding problems such as voice distortion caused by the data loss and unclear images.

In the process of "obtaining the first speed used when the interface board sends the data through the logical channel", the first speed, for example, a channel speed in the feature data, may be obtained from the feature data.

The process of "determining a forwarding manner of the interface board based on feature data and processing the data in the forwarding manner" may include, but not limited to the following manner: if the feature data includes an interface type (for example, the interface type is recorded in the feature table), the forwarding manner of the interface board may be determined based on the feature data, and the data may be processed in the forwarding manner; if the feature data does not include the interface type (for example, the interface type is not recorded in the feature table), the forwarding manner of the interface board may be determined based on the feature data and the interface type (obtained from header information of data), and the data may be processed in the forwarding manner. For example, the forwarding manner of the interface board may be determined based on parameters such as an inter-frame gap (IFG), BlockLen, PreTxLen, and an interface type, and the data may be processed in the forwarding manner, which is not limited.

Block f: after reading the second data from the buffer corresponding to the logical channel, the second speed limiting apparatus 220 also sends a data sending completion message to the first speed limiting apparatus 212. The data sending completion message may carry the length of the first data (that is, the length of the first data obtained by removing header information from the second data), and may also carry the above header information (such as an interface board identifier, a logical channel identifier, an interface type, a packet type, a sending edge of window, and a valid load length). The header information is same as the header information of the second data.

A current data sending edge TxEdge in the header information of the data sending completion message may indicate that the data corresponding to the current data sending edge TxEdge is already read from the buffer.

Block g: after receiving the data sending completion message, the first speed limiting apparatus 212 updates a remaining resource size of the logical channel corresponding to the logical channel identifier to a sum of the current remaining resource size and the size of the first data. For example, the window-occupied position is moved toward the window start position by a specified length; or, the window start position is moved toward the window-occupied position by the specified length, and the window end position is moved along the moving direction of the window start position by the specified length. The above specified length is the length of the first data.

In another example, the window start position in the sending window may also be determined based on the position of the second data in a buffer, and the window end position of the sending window may be moved based on the moving length of the window start position.

Based on the above technical solution, in an example of the present disclosure, a plurality of logical channels may share a processing capability of the same main control board, the data may be stored in a buffer corresponding to each logical channel, and the data in the buffer may be sent through the logical channel, thereby solving a problem that the main control board is unmatched with the interface board in speed, avoiding a problem of packet loss of the interface board, and satisfying a QOS requirement. Further, accurate speed limitation may be realized for the interface board, and the performance of the main control board may also be improved. For example, the data transmission speed of the logical channel 241 is 56 Kbits/s, the data transmission speed of the logical channel 242 is 56 Kbits/s, the data transmission speed of the logical channel 243 is 56 Kbits/s, and the data transmission speed of the logical channel 244 is 56 Kbits/s, therefore, the data transmission speed of the Ethernet controller 213 may be 224 Kbits/s (=4*56 Kbits/s), rather than 56 Kbits/s corresponding to a particular logical channel. The second speed limiting apparatus 220 may store data at 56 Kbits/s in the buffer 251, store data at 56 Kbits/s in the buffer 252, store data at 56 Kbits/s in the buffer 253, and store data at 56 Kbits/s in the buffer 254. When sending the data, the second speed limiting apparatus 220 may send data at 56 Kbits/s to the logical channel 241, so that the logical channel 241 may send data at 56 Kbits/s; the second speed limiting apparatus may send data at 56 Kbits/s to the logical channel 242, so that the logical channel 242 may send data at 56 Kbits/s; the second speed limiting apparatus may send data at 56 Kbits/s to the logical channel 243, so that the logical channel 243 may send data at 56 Kbits/s; the second speed limiting apparatus may send data at 56 Kbits/s to the logical channel 244, so that the logical channel 244 may send data at 56 Kbits/s.

Figure 5:
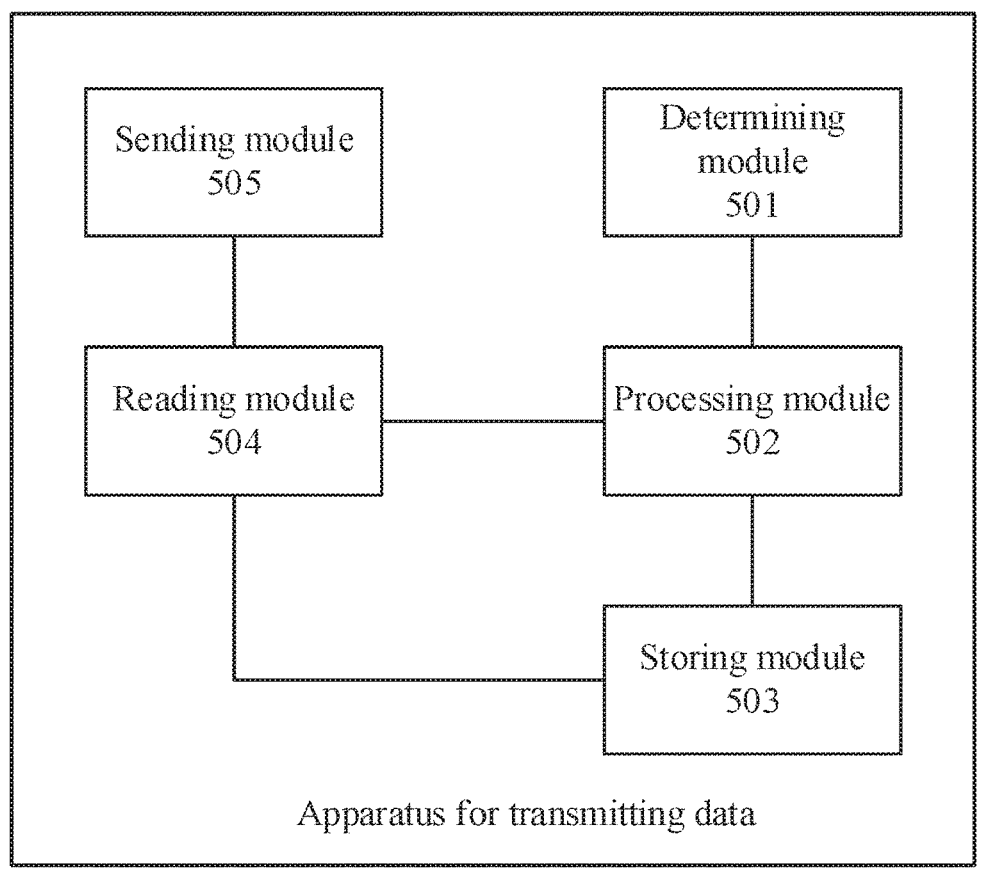
FIG. 5 is a schematic diagram illustrating a structure of an apparatus for transmitting data according to an example of the present disclosure.

Based on a same application concept as the above method, an example of the present disclosure also provides an apparatus for transmitting data. The apparatus for transmitting data may be applied to a network device. FIG. 5 is a schematic diagram illustrating a structure of the apparatus. The apparatus may include a determining module 501, a processing module 502, a storing module 503, a reading module 504 and a sending module 505.

The determining module 501 is configured to determine an interface board and a logical channel both corresponding to first data to be sent.

The processing module 502 is configured to obtain second data by adding header information to the first data when the logical channel has a capability to send the first data, where the header information includes an interface board identifier of the interface board and a logical channel identifier of the logical channel.

The storing module 503 is configured to store the second data in a buffer corresponding to the logical channel.

The reading module 504 is configured to read the second data from the buffer and obtain the interface board identifier and the logical channel identifier from the header information of the read second data and obtain the first data by removing the header information from the read second data.

The sending module 505 is configured to send the obtained first data to the interface board corresponding to the interface board identifier.

The processing module 502 is further configured to: obtain a remaining resource size of the logical channel after the determining module 501 determines the interface board and the logical channel both corresponding to the first data; if the remaining resource size is greater than or equal to a length of the first data, determine that the logical channel has a capability to send the first data; when the logical channel has a capability to send the first data, update the remaining resource size of the logical channel to a difference of the remaining resource size and the length of the first data; after the reading module 504 reads the second data from the buffer, update the remaining resource size of the logical channel corresponding to the buffer to a sum of the remaining resource size and the length of the first data.

The logical channel may correspond to a sending window, and a length of the sending window is same as a size of the buffer corresponding to the logical channel; parameters of the sending window may include a window start position, a window end position, and a window-occupied position; a length between the window-occupied position and the window end position is the remaining resource size of the logical channel. When updating the remaining resource size of the logical channel to a difference of the remaining resource size and the length of the first data, the processing module 502 is specifically configured to: move the window-occupied position toward the window end position by a specified length. When updating the remaining resource size of the logical channel corresponding to the buffer to a sum of the remaining resource size and the length of the first data, the processing module 502 is specifically configured to: move the window-occupied position toward the window start position by a specified length; or, move the window start position toward the window-occupied position by a specified length, and move the window end position along the moving direction of the window start position by the specified length. The specified length is the length of the first data.

When sending the obtained first data to the interface board corresponding to the interface board identifier, the sending module 505 is specifically configured to: obtain a first speed used when the interface board sends the first data through the logical channel; determine a second speed to be used for sending the first data to the interface board based on the first speed; and send the obtained first data to the interface board corresponding to the interface board identifier based on the second speed. The second speed is smaller than the first speed.

In an example, when determining the second speed to be used for sending the first data to the interface board based on the first speed, the sending module 505 is specifically configured to: determine a forwarding manner of the interface board based on feature data and obtain third data to be sent at the first speed by processing the first data in the forwarding manner; and determine the speed at which the first data is processed in the process of obtaining the third data as the second speed.

Figure 6:
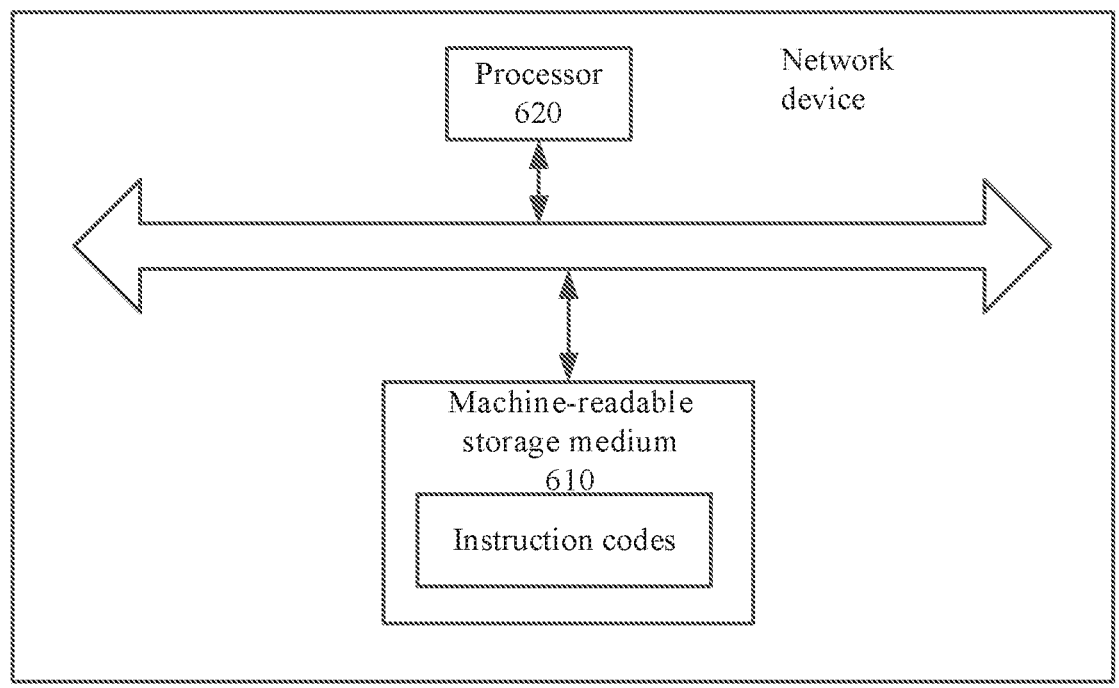
FIG. 6 is a schematic diagram illustrating a hardware structure of a network device according to an example of the present disclosure.

A network device is provided according to an example of the present disclosure. From a hardware level, a schematic diagram of a hardware architecture of the network device may be shown in FIG. 6. The network device may include: a machine-readable storage medium 610 and a processor 620.

The machine-readable storage medium 610 stores instruction codes. In an example, the machine-readable storage medium 610 may be a non-transitory storage medium.

The processor 620 communicates with the machine-readable storage medium 610, and implements data transmission operations disclosed in the above example of the present disclosure by reading and executing the instruction codes stored in the machine-readable storage medium 610.

The machine-readable storage medium herein may be any of electronic, magnetic, optical or other physical storage devices and may contain or store information such as executable instructions, data and so on. For example, the machine-readable storage medium may be a volatile memory, a non-volatile memory, or a similar storage medium. Specifically, the machine-readable storage medium may be a Radom Access Memory (RAM), a flash memory, a storage drive (e.g. hard disk drive), a solid state hard disk, any type of storage disk (e.g., optical disk, Digital Video Disk (DVD)), or a similar storage medium, or a combination thereof.

The network device provided in an example of the present disclosure may further include a first speed limiting apparatus 212 and a second speed limiting apparatus 220.

The first speed limiting apparatus 212 is configured to determine an interface board and a logical channel both corresponding to first data to be sent; if the logical channel has a capability to send the first data, obtain second data by adding header information to the first data, and send the second data to a second speed limiting apparatus 220, where the header information includes an interface board identifier of the interface board and a logical channel identifier of the logical channel.

The second speed limiting apparatus 220 is configured to: obtain the logical channel identifier from the header information of the second data after receiving the second data and store the second data in a buffer corresponding to the logical channel identifier; read the second data from the buffer, obtain the interface board identifier and the logical channel identifier from the header information of the read second data, obtain the first data by removing the header information from the second data, and send the obtained first data to the interface board corresponding to the interface board identifier.

The systems, apparatuses, modules or units described in the above examples may be specifically implemented by a computer chip or an entity or may be implemented by a product with a particular function. A typical implementing device may be a computer and the computer may be specifically a personal computer, a laptop computer, a cellular phone, a camera phone, a smart phone, a personal digital assistant, a media player, a navigation device, an email transceiver, a game console, a tablet computer, a wearable device, or a combination of any several devices of the above devices.

For convenience of description, the above apparatuses are divided into different units based on functionality for descriptions. Of course, the functions of different units may be implemented in a same or a plurality of hardware and/or software when practicing the present disclosure.

The persons skilled in the art should understand that the examples of the present disclosure may be provided as a method, a system, or a computer program product. Thus, entire hardware examples, entire software examples or examples combining software and hardware may be adopted in the present disclosure. Further, the present disclosure may be implemented in the form of a computer program product that is operated on one or more computer available storage media (including but not limited to magnetic disk memory, CD-ROM, and optical memory and so on) including computer available program codes.

The present disclosure is described by referring to flowcharts and/or block diagrams of a method, a device (a system) and a computer program product in an example of the present disclosure. It is understood that each flowchart and/or block in the flowcharts and/or the block diagrams or a combination of a flow chart and/or a block of the flowcharts and/or the block diagrams may be implemented by computer program instructions. These computer program instructions may be provided to a general-purpose computer, a dedicated computer, an embedded processor, or a processor of another programmable data processing device to generate a machine so that the instructions executable by a computer or a processor of another programmable data processing device generate an apparatus for implementing functions designated in one or more flows of the flowcharts and/or one or more blocks of the block diagrams.

Further, these computer program instructions may also be stored in a computer readable memory that can direct a computer or another programmable data processing device to work in a particular manner so that the instructions stored in the computer readable memory generate a product including an instruction apparatus and the instruction apparatus can implement functions designated in one or more flows of the flowcharts and/or one or more blocks of the block diagrams.

The computer program instructions may also be loaded on a computer or another programmable data processing devices, so that a series of operation blocks can be executed on the computer or another programmable device to generate processing achieved by the computer, and thus instructions executable on the computer or another programmable device are provided for blocks for realizing functions designated in one or more flows of the flowcharts and/or one or more blocks of the block diagrams.

The foregoing disclosure is merely illustrative of examples of the present disclosure but not intended to limit the present disclosure. Those skilled in the art may made

The invention claimed is:

1. A method of transmitting data, comprising:
   determining an interface board and a logical channel both corresponding to first data to be sent;
   when the logical channel has a capability to send the first data,
      obtaining second data by adding header information to the first data, wherein the header information comprises an interface board identifier of the interface board and a logical channel identifier of the logical channel; and
      storing the second data in a buffer corresponding to the logical channel;
   reading the second data from the buffer;
   obtaining the interface board identifier and the logical channel identifier from the header information of the read second data;
   obtaining the first data by removing the header information from the read second data; and
   sending the obtained first data to the interface board corresponding to the interface board identifier,
   wherein after determining the interface board and the logical channel both corresponding to the first data to be sent, the method further comprises:
      obtaining a remaining resource size of the logical channel;
      when the remaining resource size is greater than or equal to a length of the first data, determining that the logical channel has a capability to send the first data; and
      when the logical channel has a capability to send the first data, updating the remaining resource size of the logical channel to a difference of the remaining resource size and the length of the first data.

2. The method according to claim 1, wherein after reading the second data from the buffer, the method further comprises:
   updating the remaining resource size of the logical channel corresponding to the buffer to a sum of the remaining resource size and the length of the first data.

3. The method according to claim 2, wherein
   the logical channel corresponds to a sending window;
   a length of the sending window is same as a size of the buffer corresponding to the logical channel;
   parameters for the sending window comprise a window start position, a window end position and a window-occupied position;
   a length between the window-occupied position and the window end position is the remaining resource size of the logical channel; and
   updating the remaining resource size of the logical channel to a difference of the remaining resource size and the length of the first data comprises:
      moving the window-occupied position of the sending window corresponding to the logical channel toward the window end position of the sending window by a specified length, wherein the specified length is the length of the first data.

4. The method according to claim 3, wherein updating the remaining resource size of the logical channel corresponding to the buffer to a sum of the remaining resource size and the length of the first data comprises:
   moving the window-occupied position of the sending window corresponding to the logical channel toward the window start position of the sending window by the specified length; or,
   moving the window start position of the sending window toward the window-occupied position of the sending window by the specified length, and moving the window end position of the sending window along the moving direction of the window start position of the sending window by the specified length.

5. The method according to claim 1, wherein the process of sending the obtained first data to the interface board corresponding to the interface board identifier comprises:
   obtaining a first speed used when the interface board sends the first data through the logical channel;
   determining a second speed used when the first data is sent to the interface board based on the first speed; and
   sending the obtained first data to the interface board corresponding to the interface board identifier based on the second speed,
   wherein, the second speed is smaller than the first speed.

6. The method according to claim 5, wherein the process of determining the second speed used when the first data is sent to the interface board based on the first speed comprises:
   determining a forwarding manner of the interface board based on feature data;
   obtaining third data to be sent at the first speed by processing the first data in the forwarding manner; and
   determining a speed at which the first data is processed as the second speed in the process of obtaining the third data.

7. A network device, comprising:
   a first speed limiting apparatus, configured to:
      determine an interface board and a logical channel both corresponding to first data to be sent;
      when the logical channel has a capability to send the first data, obtain second data by adding header information to the first data, wherein the header information comprises an interface board identifier of the interface board and a logical channel identifier of the logical channel; and
   a second speed limiting apparatus, configured to:
      after receiving the second data from the first speed limiting apparatus,
         obtain the logical channel identifier from the header information of the second data, and
         store the second data in a buffer corresponding to the logical channel identifier;
      read the second data from the buffer,
      obtain the interface identifier and the logical channel identifier from the header information of the read second data, and obtain the first data by removing the header information from the read second data, and
      send the obtained first data to the interface board corresponding to the interface board identifier,
      wherein the first speed limiting apparatus is configured to, after determining the interface board and the logical channel both corresponding to the first data to be sent:
         obtain a remaining resource size of the logical channel;
         when the remaining resource size is greater than or equal to a length of the first data, determine that the logical channel has a capability to send the first data; and when the logical channel has a capability to send the first data, update the remaining resource size of the logical channel to a difference of the remaining resource size and the length of the first data.

8. The network device according to claim 7, wherein after the second data is read from the buffer, the first speed limiting apparatus is configured to,
update the remaining resource size of the logical channel corresponding to the buffer to a sum of the remaining resource size and the length of the first data.

9. The network device according to claim 8, wherein
the logical channel corresponds to a sending window;
a length of the sending window is same as a size of the buffer corresponding to the logical channel;
parameters for the sending window comprise a window start position, a window end position and a window-occupied position;
a length between the window-occupied position and the window end position is the remaining resource size of the logical channel; and
the first speed limiting apparatus is configured to update the remaining resource size of the logical channel to a difference of the remaining resource size and the length of the first data by:
moving the window-occupied position of the sending window corresponding to the logical channel toward the window end position of the sending window by a specified length, wherein the specified length is the length of the first data.

10. The network device according to claim 9, wherein the first speed limiting apparatus is configured to update the remaining resource size of the logical channel corresponding to the buffer to a sum of the remaining resource size and the length of the first data by:
moving the window-occupied position of the sending window corresponding to the logical channel toward the window start position of the sending window by the specified length; or,
moving the window start position of the sending window toward the window-occupied position of the sending window by the specified length, and moving the window end position of the sending window along the moving direction of the window start position of the sending window by the specified length.

11. The network device according to claim 7, wherein the second speed limiting apparatus is configured to send the obtained first data to the interface board corresponding to the interface board identifier by:
obtaining a first speed used when the interface board sends the first data through the logical channel;
determining a second speed used when the first data is sent to the interface board based on the first speed; and
sending the obtained first data to the interface board corresponding to the interface board identifier based on the second speed,
wherein, the second speed is smaller than the first speed.

12. The network device according to claim 11, wherein the second speed limiting apparatus is configured to determine the second speed used when the first data is sent to the interface board based on the first speed by:
determining a forwarding manner of the interface board based on feature data;
obtaining third data to be sent at the first speed by processing the first data in the forwarding manner; and
determining a speed at which the first data is processed as the second speed in the process of obtaining the third data.

* * * * *